United States Patent [19]

Iuchi et al.

[11] Patent Number: 4,638,975
[45] Date of Patent: Jan. 27, 1987

[54] FLUID COUPLER

[75] Inventors: Akira Iuchi, Kobe; Shinya Tsunokawa, Osaka, both of Japan

[73] Assignee: Osaka Gas Company Limited, Higashi, Japan

[21] Appl. No.: 635,023

[22] Filed: Jul. 27, 1984

[30] Foreign Application Priority Data

Jul. 30, 1983 [JP] Japan ............................ 58-118978[U]

[51] Int. Cl.$^4$ ............................................. F16L 37/28
[52] U.S. Cl. ............................ 251/149.6; 137/614.05
[58] Field of Search ................. 251/149.6; 137/614.05

[56] References Cited

U.S. PATENT DOCUMENTS

| 3,052,261 | 9/1962 | Nyberg | 137/614.04 |
| 3,131,905 | 5/1964 | Nyberg | 251/149.6 |
| 3,406,942 | 10/1968 | Bocceda | 251/149.4 |
| 3,457,954 | 7/1969 | Nyberg | 137/625.28 |

FOREIGN PATENT DOCUMENTS 1902986 8/1970 Fed. Rep. of Germany ... 251/149.6

Primary Examiner—James C. Yeung
Assistant Examiner—Allen J. Flanigan
Attorney, Agent, or Firm—Armstrong, Nikaido, Marmelstein & Kubovcik

[57] ABSTRACT

A fluid coupler having a female coupling member with an incorporated valve and a male coupling member for detachable insertion into one end portion of the female coupling member. The female coupling member has an annular flange which projects inwardly thereof to define a valve seat and a head portion having a diameter larger than the inside diameter of the annular flange and cooperative therewith to form the valve. A compression spring biases the valve member forwardly into a closed position. When the male coupling member is inserted, the valve member is biased against the force of the compression spring to open the valve and allow fluid flow from the valve into the male coupling member.

7 Claims, 8 Drawing Figures

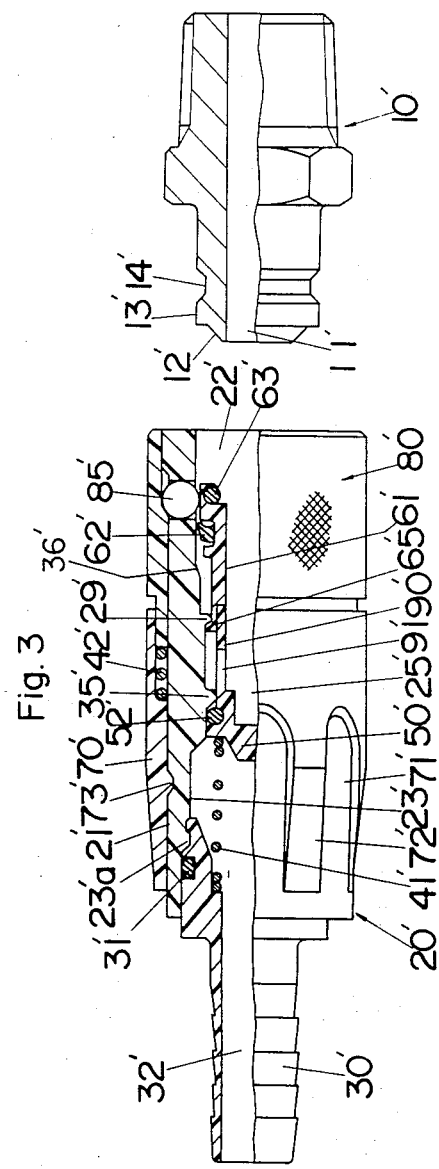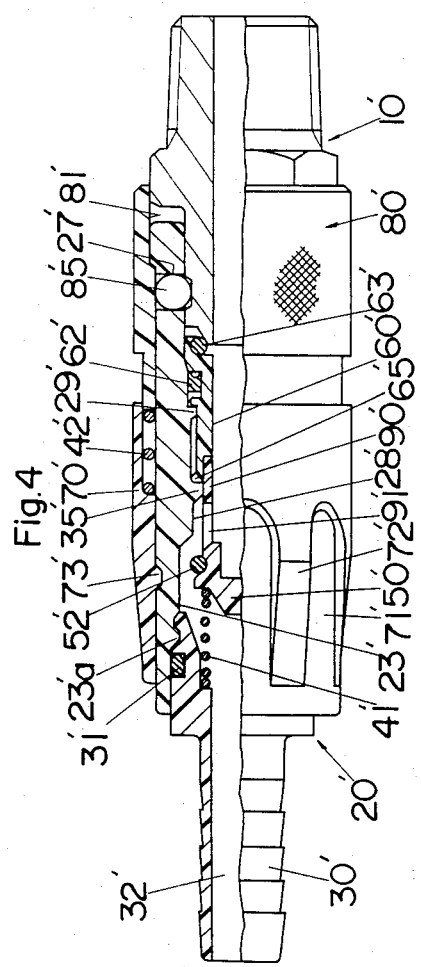
Fig. 3
Fig. 4

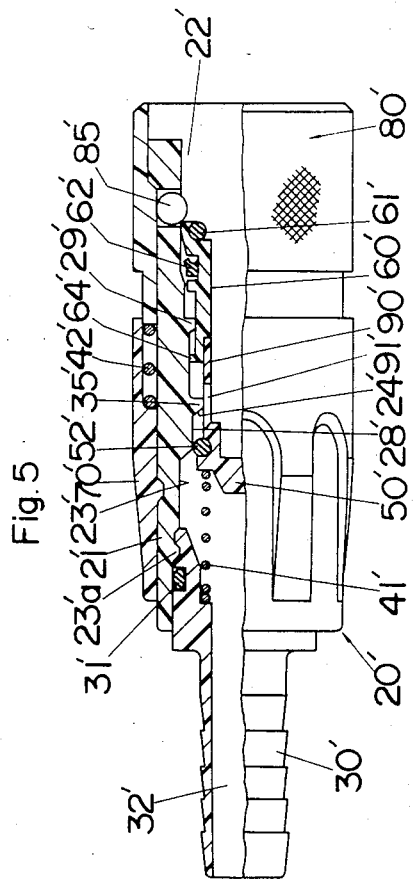
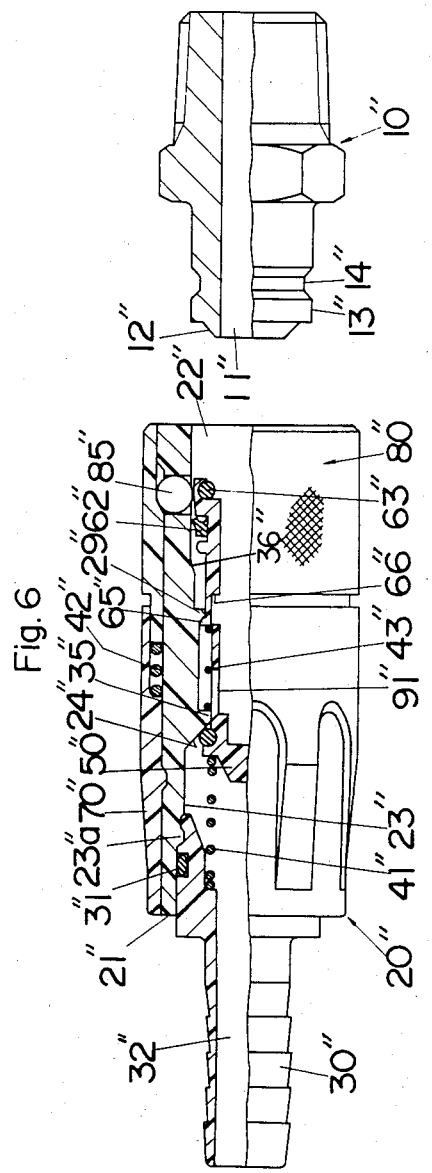

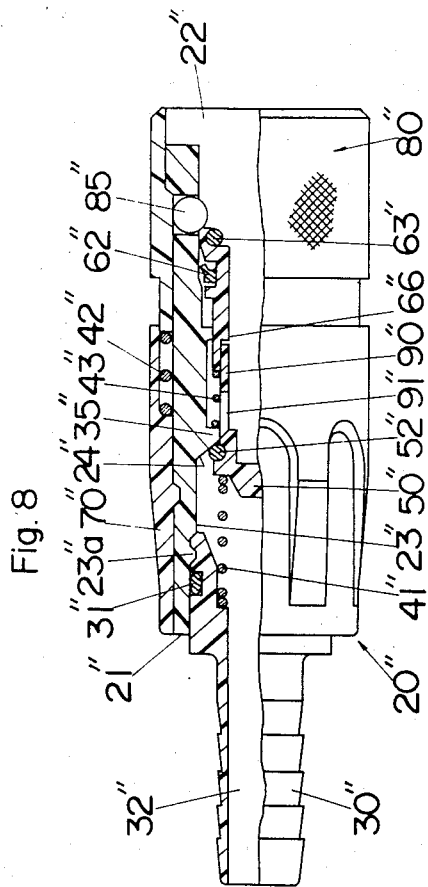

FLUID COUPLER

DESCRIPTION OF THE PRIOR ART

1. Fields of the Invention

The present invention relates to a fluid coupler for joining fluid lines to conduct fluid under pressure, such as utility gas for household use.

2. Description of the Prior Art

There have been proposed a wide variety of fluid couplers consisting of a female coupling member with an incorporated valve and a male coupling member which are so constructed as to automatically cut off fluid flow therebetween upon detachment and start fluid flow upon attachment. One known and typical prior fluid coupler is disclosed in FIGS. 1 through 6 of U.S. Pat. No. 3,052,261 to C. E. J. Nyberg, in which a male coupling member is detachably received within one end portion of a female coupling member so as to open a valve formed within the female coupling member. The female coupling member is shaped into a cylindrical tube with an inwardly projecting annular flange defining a valve seat which is cooperative with an axially movable valve member to define the valve. Movable valve member is provided at its one axial end with a tubular portion and is provided at the opposite axial end with a sealing ring, both having a greater diameter than the annular projection, and is received within the female coupling member to be movable between a closed position where the sealing ring is in sealing contact with the annular flange and an open position where the sealing ring is out of sealing contact with the flange. A compression spring is interposed between the tubular portion and the annular flange to axially bias the valve member into the closed position such as to open the valve only when the male coupling member is inserted into the female coupling member to force the valve member against the biasing force of the spring to move into the open position. In such prior art coupler, however, the sealing ring and the tubular portion, both having a greater diameter than the internal diameter of the annular flange, must be located on opposite sides of the annular flange, which makes it difficult to assemble the valve member into the female coupling member. In fact, such assembly can be only possible with the arrangement of fitting the sealing ring around a corresponding portion of the valve member after passing the sealing ring receiving portion through the annular flange against the biasing force of the spring, which makes the assembling of the valve member complicated and, therefore, requires a higher degree of skill. Further, since the sealing ring receiving portion is not allowed to have a greater diameter than the inside diameter of the annular flange for ensuring the insertion thereof through the annular flange, and the sealing ring is fitted around such receiving portion in the form of an annular groove, the sealing ring is not expected to be supported enough to bear excessive sealing force. With the result of this, there arises a serious problem that increasing the sealing force between the sealing ring and the annular flange or the valve seat is liable to jeopardize the secure holding of the sealing ring in place and, therefore, is liable to miss the sealing, thus limiting the sealing force to a lower value. Accordingly, the secure sealing contact having a greater sealing force cannot be expected from the construction of this prior art fluid coupler.

SUMMARY OF THE INVENTION

The above drawbacks and insufficiency have been overcome by the present invention which is so devised as to assure simple and easy assembly of a valve member into a female coupling member in which the valve member is cooperative with a valve seat to form a valve as well as to provide a secure and strong sealing of the valve. The female coupling member comprises a generally cylindrical main body shaped to have an axial bore with a front opening for receiving, detachably, the male coupling member 10 and a rear opening for receiving a connection plug to be connected to a source of fluid. Formed intermediate the axial ends of the main body 21 is an annular flange which projects inwardly thereof to define a valve seat. The valve member axially slidably received within the main body and is formed with a head portion having an outside diameter greater than the inside diameter of said internal annular flange and located on the rear side thereof so as to be cooperative with said valve seat to define said valve in which the enlarged head portion is responsible for secure sealing action with the valve seat of the annular flange. A compression spring is interposed between the valve member and the connection plug for biasing the valve member into a closed position so as to cut off fluid flow when the male coupling member is absent. A tubular member is axially slidably received within the main body forwardly of the valve member and is provided at its front end with first sealing means adapted to be brought into sealing contact with the male coupling member upon insertion thereof into the main body. Also provided around the periphery of the tubular member is a second sealing means which projects outwardly therefrom for sealing with the inner surface of the main body so as to flow the fluid through the tubular member into the male coupling member without leakage when the valve member is in an open position. A thrust member operatively interconnects the valve member and the tubular member such that when the male coupling member is inserted in the female coupling member the tubular member will be forced thereby to thrust the valve member to move it rearwards against the biasing force of the compression spring into the open position. This thrust member is arranged substantially to not prevent fluid flow from the valve into the tubular member when the valve is opened. The male and female coupling members can be locked in a connecting position by locking means. The assembly of the valve and tubular members into the female coupling member is much facilitated in the present invention because the valve member, and the tubular member both of greater outside diameter than the inside diameter of the valve seat, can be manufactured separately and inserted respectively through the rear and the front openings of the female coupling member into the positions on both sides of the annular flange.

It is therefore a primary object of the present invention to provide a fluid coupler wherein assembly of a valve member into a female coupling member is much facilitated, retaining secure sealing between the valve member and a valve seat.

In a preferred embodiment of the present invention, the valve incorporated in the female coupling member is arranged such that it is allowed to move rearwardly a limited distance, while keeping the valve closed, for compressing the biasing spring of the valve member to an extent that the restoring force of the compressed spring will provide enough sealing force between the male coupling member and the tubular member. With this arrangement, the valve is opened only after the secure sealing connection has been established between the tubular member and the male coupling member, thus preventing the leakage of fluid from the connection between the male coupling member and the tubular member at the instant of opening the valve upon connection of the male coupling member to the female coupling member.

It is therefore another object of the present invention to provide a fluid coupler which is free from the danger of fluid leakage at the instant of connecting the male coupling member to the female coupling member.

In the above embodiment the locking means for locking and male and female coupling members comprises at least one locking ball retained in a radial hole in the front peripheral wall of the main body. The locking ball is biased toward a lock position where it projects inwardly of the main body into an annular groove in the end portion of the male coupling member to lock the same when the male coupling member is inserted in the main body, and is prevented from projecting into the lock position by being restricted by the outer surface of the tubular member when the latter is biased into a frontmost position in the absence of the male coupling member. The limited distance within which the valve member is allowed to move while keeping the valve closed is designed to be longer than the travelling length of the tubular member required to release the ball out of the abutting engagement therewith. Accordingly, even if the tubular member is forced by some reason to move rearwards independently of the male coupling member 10 and to be accidentally locked at its front end by the locking balls projecting inwardly of the main body, the valve is still kept closed so that the fluid under pressure will be prevented from leaking.

It is therefore a further object of the present invention to provide a fluid coupler which is capable of preventing fluid leakage even if it is improperly used so as to accidentally lock the tubular member in the rearwardly retarded position without the male coupling member.

In the above embodiment, the thrust member is generally of tubular configuration with a plurality of apertures formed in the peripheral wall thereof for permitting fluid flow therethrough and is integral with the valve member to extend forwardly therefrom. The front end of the thrust member is inserted interiorly of a thin-walled rear end portion of the tubular member which is provided on its outer surface with an annular projection that abuts against a stopper rib projecting inwardly from the inner surface of the main body to prevent the tubular member from being removed through the front opening of the main body. The thin-walled rear end portion is capable of resiliently flexing outwardly and inwardly so that the tubular member can be assembled into the main body by flexing inwardly that portion to pass the annular projection beyond the stopper rib and that the annular projection is prevented from flexing inwardly by the front end portion of the thrust member after the front end portion of the thrust member is inserted interiorly of the thin-walled rear end portion of the tubular member.

It is therefore a still further object of the present invention to provide a fluid coupler, with a simple construction, which is capable of preventing a tubular member from being removed through the front opening of a main body.

Additional feature of the present invention resides in that the main body is formed on its inner surface at the portion corresponding to a second sealing ring around the tubular member with a cam surface which is tapered rearwardly to have a larger diameter section forwardly thereof and have a reduced diameter section rearwardly thereof. The second sealing ring is arranged such that it is located in the larger diameter section, while the valve is kept close, to be free from being compressed thereby and that it passes through cam surface into the reduced diameter section, when the valve is caused to open, to be compressed into sealing contact therewith, whereby the sealing between the tubular member and the main body is tightened only while the male coupling member is connected to the female coupling member and is kept loosened while the male coupling member is released, which serves to mitigate the fatigue of the sealing ring commonly made of artificial rubber and like elastic materials. Therefore, there is assured secure sealing as well as an extended sealing life.

It is therefore an additional object of the present invention to provide a fluid coupler which is capable of providing secure sealing between the tubular member and the main body of the female coupling member over an extensive period of use.

Other objects and advantages of the present invention will be readily understood from the detailed description thereon taken with the accompanying drawings.

BRIEF DESCRIPTION OF THE DRAWINGS

In the drawings,

FIG. 3 is a sectional view of a fluid coupler in its disconnected condition according to a second embodiment of the present invention;

FIG. 4 is a view similar to FIG. 3 but shows the connected condition;

FIG. 5 is a view similar to FIG. 4 but shows a case in which a tubular member is unintentionally locked by locking balls.

FIG. 6 is a sectional view of a fluid coupler in its disconnected position according to a third embodiment of the present invention;

FIG. 8 is a view similar to FIG. 7 but shows a case is which a tubular member is unintentionally locked by locking balls.

DESCRIPTION OF THE PREFERRED EMBODIMENT

Figure 1:
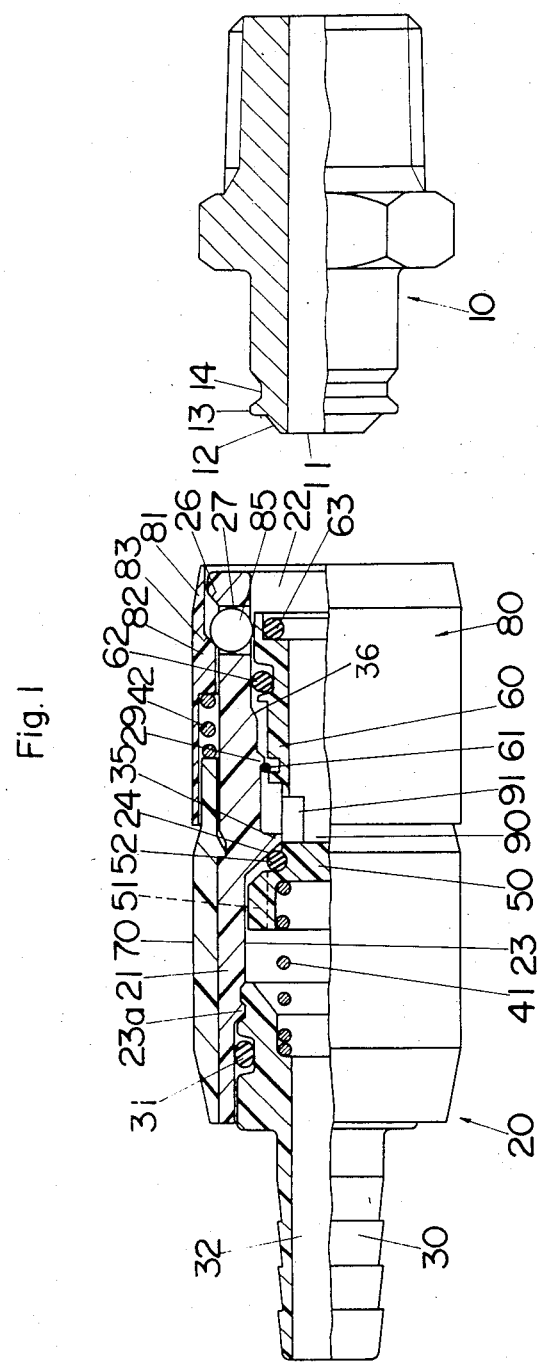
FIG. 1 is a sectional view of a fluid coupler with a female coupling member disconnected from a male coupling member in accordance with a first preferred embodiment of the present invention.
Figure 2:
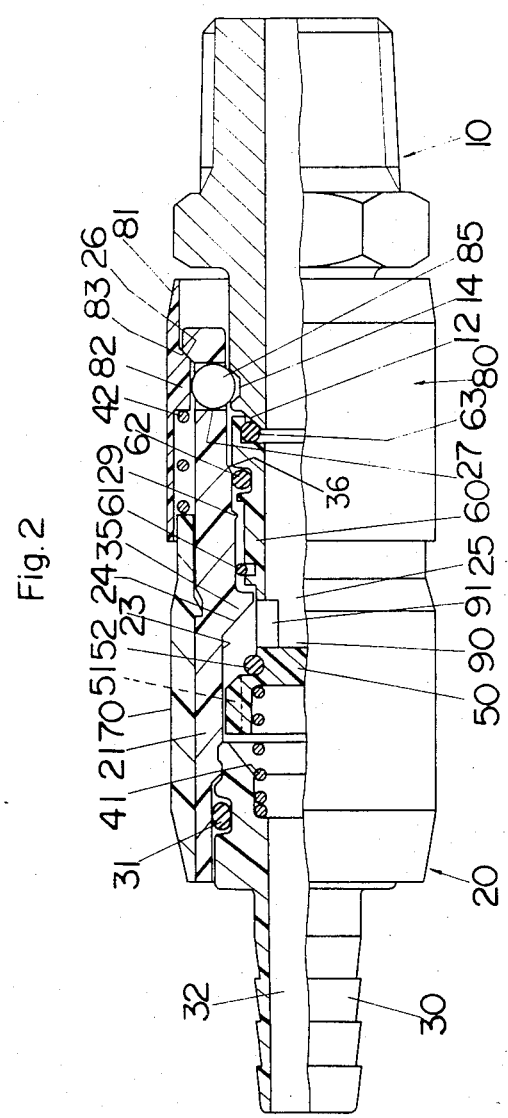
FIG. 2 is a view similar to FIG. 1 but with the male and female coupling members connected.

Referring now to FIG. 1 and FIG. 2, there is illustrated a fluid coupler in accordance with a first preferred embodiment of the present invention. The fluid coupler comprises a male coupling member 10 and a female coupling member 20. The male coupling member 10 is generally of cylindrical configuration and is adapted to be connected into the female coupling member 20. The female coupling member 20 comprises a main body 21 of cylindrical configuration having an axial bore with different inside diameters therealong. The front opening 22 of the main body 21 is to receive an inlet end 11 of the male coupling member 10 and the rear opening thereof is to receive a connection plug or hose connector 30 to be connected to a source of fluid by means of a suitable hose. The hose connector 30 is press fitted at its front half into the main body 21 of the female coupling member 20. The hose connector 30 is provided on the outer surface of the front half thereof with two annular grooves, one for receiving a sealing ring 31 to ensure sealing contact between the hose connector 30 and the main body 21, and the other for receiving an internal projection 23a on an inner surface 23 of the main body 21 for secure fastening of the hose connector 30 in the main body 21. The hose connector 30 is provided therethrough with an axially elongated flow path 32 of cylindrical configuration the front end of which is enlarged to receive the rear end portion of a compression spring 41. An annular flange 35 is projected inwardly from the inner surface 23 of the main body 21 to define a valve seat 24 at the rearward face thereof as well as define inside thereof a valve opening 25 to permit a fluid flow. A valve member 50 is slidably carried within the confines of said main body 21 to close the valve opening 25 when moved forwardly to be in sealing contact with said valve seat 24 and to open the same when moved rearwardly to be out of sealing contact with said valve seat 24. The valve member 50 is formed of a head portion having a diameter larger than the inside diameter of said annular flange 35 and a flattened barrel extending integrally therefrom to have a diameter smaller than the inside diameter of the annular flange 35 for being extensible through the valve opening 25. A sealing ring 52 is received in an annular groove formed in the barrel immediately adjacent the front end of the head portion and is brought into sealing contact with said valve seat 24 on the annular flange 35 when the valve member 50 is in a closed position while it leaves away from the valve seat 24 to open the valve when the valve member 50 moves rearwards against the biasing force of the compression spring 41. There are a plurality of circumferentially spaced fluid passages 51 formed in the outer surface of the head portion to extend the entire axial length thereof for permitting an axial fluid flow therethrough, so that when the sealing ring 52 is out of sealing contact with the valve seat 24 and fluid will flow in the forward direction through the passages 51 and through the valve opening 25. The valve member 50 is provided at its rear end with a concave portion to receive the front end portion of the compression spring 41. The compression spring 41 is for biasing the valve member 50 toward the valve seat 24 so as to normally close the valve opening 25. A tubular member 60 of cylindrical configuration is slidably carried inside the front opening 22 of the main body 21 and is provided at its outer surface with two annular grooves to respectively receive sealing rings 61 and 62, which ensure sealing contact between the tubular member 60 and the inner surface 23 of the main body 21. At the portion along the axial length within which the sealing ring 62 moves with the tubular member 60 there is formed a cam surface 36 facing forwardly to define a larger diameter section forwardly thereof and a smaller diameter section rearwardly thereof. The relation between the sealing ring 62 and the cam surface 36 is such that when the tubular member 60 is held in the forwardmost position, as shown in FIG. 1, the sealing ring 62 is within the larger diameter section without being compressed and that when the tubular member 60 is forced by the male coupling member 10 rearwardly to open the valve, as shown in FIG. 2, the sealing ring 62 cams over the cam surface 36 into the smaller diameter section at which it is compressed enough to made secure sealing contact with the main body 21. The main body 21 is provided on its inner surface 23 with a stopper rib 29 the rearward portion of which is, when the tubular member 60 is moved into a frontmost position, as shown in FIG. 1, in abutting engagement with the sealing ring 61 to prohibit the disengagement of the tubular member 60 from the main body 21. The front end portion of the tubular member 60 is arranged to permit sealing contact with the inlet end 11 of the male coupling member 10. To this end, the front end of the tubular member 60 is provided in its inner surface a recessed portion to receive a sealing ring 63 therein, which ensures sealing contact between the front end portion of the tubular member 60 and the inlet end 11 of the male coupling member 10. The male coupling member 10 is shaped to have a tapered end face 12 adapted to become in sealing contact with sealing ring 63. The sealing rings 31, 52, and 61 through 63 are commonly made of artificial rubber. The principal members of the female coupling member 20 including the main body 21, the hose connector 30, the valve member 50, the tubular member 60, an outer sleeve 70, and a sliding sleeve 80 are made of synthetic resin, while the male coupling member 10 is made of metal. A thrust member 90, defined by the rear end portion of the tubular member 60, is provided with a plurality of axially elongated apertures 91 circumferentially spaced about the longitudinal axis of the tubular member 60 to permit a radial fluid flow therethrough. The thrust member 60 abuts against the barrel of the valve member 50 to be movable therewith so that it extends into the portion rearwardly of the annular flange 35 to have their apertures 91 communicated with the flow passages 51 for flowing the fluid into the tubular member 60 and therefore into the male coupling member 10 when the tubular member 60 is forced by the male coupling member 10 to move the valve member 50 into the open position, as shown in FIG. 2. The main body 21 is wrapped on its rear half by the outer sleeve 70 fixed thereon and on its front half by the handle ring or sliding sleeve 80 which is slidable axially within a limited range. The sliding sleeve 80 is provided with a guide portion 81 slidable on the flanged end 26 of the main body 21 and with an inward shoulder 82 the front end of which is chamfered as indicated at 83. The outer surface of the sliding sleeve 80 is knurled for easy manipulation. The main body 21 is provided at its front with a plurality of radial openings 27 extending through the cylindrical wall thereof. A plurality of radially movable metal locking balls 85 are received respectively in said radial openings 27. The tubular member 60 is capable of locking said locking balls 85 out with its outer cylindrical surface when moved forwardly, as shown in FIG. 1, and allows the locking balls 85 to project inwardly from the inner surface 23 of the main body 21 when moved rearwardly, as shown in FIG. 2. An annular groove 14 arranged to receive the locking balls 85 is formed on an outer surface of the male coupling member 10. The male coupling member 10 is provided in the rearward vicinity of the annular groove 14 with a shoulder 13 the outside diameter of which is as long as that of the tubular member 60. The sliding sleeve 80 is movable back into a position where the chamfer 83 is behind the balls 85 as illustrated in FIG. 1, though it is biased forwardly by means of a compression spring 42 incorporated within a space between the main body 21 and the rear half of the sliding sleeve 80 and bearing against the front end portion of the outer sleeve 70 and the rear end portion of the inward shoulder 82. When the balls 85 are prevented from moving inwardly by the tubular member 60 as shown in FIG. 1, they hold the sliding sleeve 80 by interlocking action at the chamfer 83. When the balls 85 are allowed to move inwardly, as shown in FIG. 2, the shoulder 82 at the chamfer 83 comes into abutting engagement with the flanged end 26. The shoulder 82 at this time locks the balls 85 in, so that the balls 85 are received in the annular groove 14 of the male coupling member 10 to prevent the same from being disengaged from the female coupling member 20.

Operation in detail of the present embodiment is as follows, referring firstly to FIG. 1:

When the male coupling member 10 is disengaged from the female coupling member 20, as shown in FIG. 1, the valve member 50 is in sealing contact with the valve seat 24 by reason of the biasing force of the compression spring 41 plus the pressure of the fluid behind valve member 50. The locking balls 85 at this time are locked out by the outer surface of the tubular member 60 to be in abutting engagement with the chamfer 83, holding the sliding sleeve 80 out of a locking position against the bias of the compression spring 42. When the male coupling member 10 is inserted into the female coupling member 20 as shown in FIG. 2, the valve member 50 is forced to move rearwardly to open the valve opening 25 at the same time sealing contact between the front end of the tubular member 60 and the inlet end 11 of the male coupling member 10 is ensured by the bias of the compression spring 41. The locking balls 85 at this time are received in the annular groove 14 of the male coupling member 10, permitting the sliding sleeve 80 to move by the bias of the compression spring 42 forwardly into a locking position where the chamfer 83 is in abutting engagement with the flanged end 26. In this locking position, the locking balls 85 are locked in by the inward shoulder 82 to prevent the male coupling member 10 from being removed from the female coupling member 20. Release is quite easily effected simply by pulling the sliding sleeve 80 rearwardly. This withdraws the shoulder 82 out of the locking position to release the locking balls 85 from the annular groove 14. The locking balls 85 lifted from the annular groove 14 is relayed from the shoulder 13 of the male coupling member 10 onto the outer surface of the tubular member 60 to return to the initial state shown in FIG. 1.

In the present embodiment, the compression spring 41 is used not only for biasing the valve member 50 toward the valve seat 24 so as to ensure sealing contact therebetween but also for biasing the tubular member 60 toward the male coupling member 10 so as to ensure sealing contact between the front end of the tubular member 60 and the inlet end 11 of the male coupling member 10. When the male coupling member 10 is disengaged from the female coupling member 20, the fluid leakage from the female coupling member 20 is prevented by the former reason, and when the male coupling member 10 is connected to the female coupling member 20, the fluid leakage from the connecting portion thereof is prevented by the latter reason. Therefore, the compression spring 41 in the present embodiment serves to prevent the fluid leakage either in the case of the male coupling member 10 being connected to the female coupling member 20 or in the case of the male coupling member 10 being disconnected from the female coupling member 20.

A second embodiment of the present invention shown in FIGS. 3 through 5 is substantially similar in construction to the first embodiment except that a valve construction differs to some extent from that of the first embodiment. Therefore, the same reference numerals as used in the preceding figures are employed to indicate the corresponding parts to avoid the necessity for repeating the relevant explanation. In this embodiment, a cylindrical inner surface 23' of a main body 21' of a female coupling member 20' is provided with an axially elongated and radially reduced platform 28' which is formed just behind an annular flange 35' projecting inwardly at the intermediate portion along the axial length of the female coupling member 20' and which terminates at its rear end in an enlarged diameter section at the rear end of the main body 21'. A valve member 50', which is cooperative with the annular flange 35' to define the valve, is received within the main body 21' to be axially movable by a distance longer than the axial length of the platform 28'. Mounted on the valve member 50' is a sealing ring 52' which is arranged to make sealing contact with either of the annular flange 35' or the platform 28' and to become out of sealing contact with the inner surface of said enlarged diameter section, whereby the valve is closed so long as the sealing ring 52' is in sealing contact with the platform 28' even when the valve member 50' moves rearwardly to leave the sealing ring 52' from the annular flange 35'. Therefore, the valve will open only when the valve member 50' further moves rearwards to have the sealing ring 52' away from the rear end of the platform 28'. At this occurrence, the fluid will flow through the clearance of fluid passage between the valve member 50' and the inner surface of the main body 21' and flow into the male coupling member 10' through radial openings in an extension tube 90' extending integrally from the valve member 50'. The extension tube 90' is shaped to have the outside diameter capable extending through the valve opening 25' and connected to a tubular member 60' against which the male coupling member 10' abuts, so that the valve member 50 is forced to move rearwardly together with the tubular member 60' by the insertion of the male coupling member 10' into the female coupling member 20'. Also the extension tube 90' is so arranged to go rearwardly beyond the annular flange 35' when said sealing ring 52' is out of sealing contact with the inner surface of the main body 21' for passing the fluid therethrough into the tubular member 60' and therefore the male coupling member 10'. In this sense, the extension tube 90 serves as the thrust member 90' in the first embodiment, although it is integrally formed with the valve member 50'. With this arrangement that the valve member 50' can move rearwardly a certain distance without opening the valve, the compression spring 41' can be compressed to develop enough sealing force between the male coupling member 10' and the tubular member 60' before the valve opens. In other words, the valve is so arranged not to open until enough sealing force by the compressed spring 41' can be developed between the male coupling member 10' and the tubular member 60'. Accordingly, accidental leakage from the connection between these members at the time of inserting the male coupling member into the female coupling member 20' can be prevented.

Further, the axial length of platform 28' is further arranged to be longer than the travelling length of the tubular member 60° required to release locking balls 85' from the outer surface thereof. Accordingly, in this embodiment, even if the tubular member 60' is, forced independently of the male coupling member to be accidentally locked in the absence of the male coupling member 10' at its front end by the locking balls 85' projecting inwardly of said cylindrical wall, as shown in FIG. 5, the sealing ring 52' on the valve member 50' is still held in position to make sealing contact with the platform 28' for prevention of fluid leakage from the female coupling member 20'.

The valve member 50' is provided on its rear end surface with a circular enlargement to receive the front end of the compression spring 41'. The rear portion or head portion of the valve member 50' is designed to have an outside diameter little shorter than the inside diameter of the section corresponding to said platform 28' but larger than the inside diameter of the annular flange 35' enough to securely back up the sealing ring 52'. The outer sleeve 70' in this embodiment is provided with a plurality of axially cut away portion 71' circumferentially spaced to define a plurality of resilient legs 72' therebetween. Each resilient leg 72' is provided intermediate of its inner surface with an enlargement 73' to be received within corresponding annular groove formed on the outer surface of the main body 21. Thus, the outer sleeve 70' can be easily fitted on the main body 21' by resiliently flexing the legs outwardly until the enlargements 73' fall into the groove. After the enlargements 73' are received in the corresponding groove, each resilient leg 72 is restored inwardly to be fixedly fastened to the main body 21. The tubular member 60' is formed on its rear end with an annular projection 65' which is designed to abut against a stopper rib 29' so as to limit the forward movement of the tubular member 60' for prevention of the removal thereof from the main body 21'. The rear end portion of the tubular member 60' is thin-walled to be capable of resiliently flexing outwardly and inwardly and is designed to be received the front end portion of said extension tube or the thrust member 90' therein. With the result of this, the tubular member 60' can be easily assembled into the main body 21' only by flexing inwardly the thin-walled portion to pass the annular projection 65' beyond the stopper rib 29', and such thin-walled portion is supported by the thrust member 90' after being connected thereto so that it never flex inwardly for assuring the abutting engagement of the annular projection 65' with the stopper rib 29'.

Figure 7:
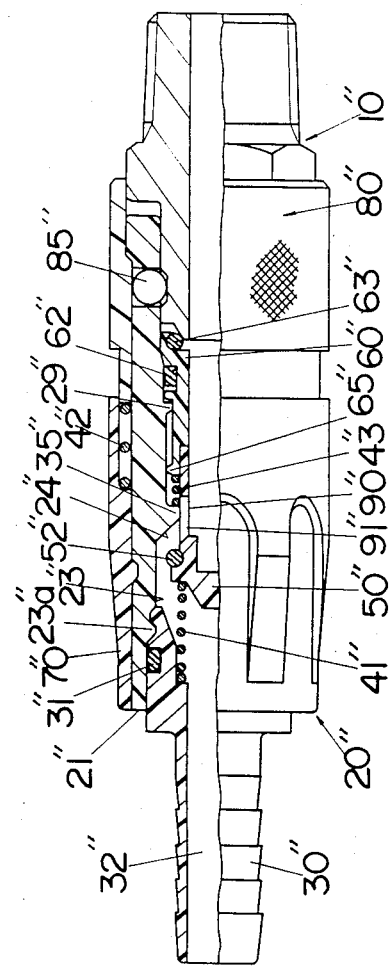
FIG. 7 is a view similar to FIG. 6 but shows the connected condition.

A third embodiment of the present invention shown in FIGS. 6 through 8 is substantially similar in construction to the first embodiment except that a valve member 50" and a tubular member 60" are biased by different compression springs 41" and 43". Therefore, the same reference numerals as used in the preceding figures are employed to indicate the corresponding parts to avoid the necessity for repeating the relevant explanation. In this embodiment, the valve construction is rather simple in that said platform 28" in the second embodiment is not required. But, the secure sealing contact between a male coupling member 10" and the tubular member 60" prior to opening the valve as well as the prevention of the tubular member 60" from being locked in the position of opening the valve, both being the advantageous features accomplished in the second embodiment, are still retained in this embodiment by the employment of the tubular member 60" arranged to be freely movable within a limited axial length with respect to the valve member 50" of the same construction as in the second embodiment. That is, the tubular member 60" is slidably connected axially to the valve member 50" in such a manner as to receive the front end portion of the thrust member 90" integral with the valve member 50" in the rear recessed portion in the inner surface thereof, so that it moves axially freely within the limited axial length of said recess and it moves with the valve member 50" after the recessed portion has received the full length thereof the rear portion of the valve member 50". The additional compression spring 43" is disposed between an annular flange 35" and the rear end of the tubular member 60" to bias the latter forwardly until an annular projection 65" on the rear end of the tubular member 60" engages a stopper rib 29" on the inner surface of a main body 21", as shown in FIG. 6, whereby the tubular member 60" will be forced by the male coupling member 10" inserted to move rearwards against the biasing force of the additional spring 43" independently of the valve member 50" within said limited length before it pushes the valve member 50" into the open position during which the spring 43" is compressed to exert enough sealing force between the tubular member 60" and the male coupling member 10". Accordingly, as shown in FIG. 7, the valve member 50" will be forced by the male coupling member 10" through the tubular member 60" to move into the open position only after the tubular member 60" has traveled the limited length to ensure the sealing between the male coupling member 10" and the tubular member 60", preventing leakage of fluid flow from the connection between these members at the instance of opening the valve. The sealing is effected by a sealing ring 63" held in the inner periphery of the front end of the tubular member 60" to become sealing contact with the tapered end face of the male coupling member 10". The limited distance within which the tubular member 60" can move axially independently of the valve member 20" is set to be longer than the travelling length of the tubular member 60" required to release clutch balls 85" from the outer surface thereof, the clutch balls 85" being of the same arrangement as in the preceding embodiments to lock the male coupling member 10" in a female coupling member 20". With the result of this, even if the tubular member 60" is caused to move rearwardly by some reason without being accompanied by the male coupling member 10" to a position at which the locking balls 85" project inwardly immediate the front end of the tubular member 60" to lock the same in, as shown in FIG. 8, the valve member 50" is held stationary by the action of the spring 41" to be in the closed position, preventing the accidental fluid leakage from the female coupling member 20" in the air and therefore assuring safe guard measure against improper manipulation of the female coupling member 20".

Although the present invention has been described in its preferred embodiments, it should be understood by those skilled in the art that the present invention is not limited to the present embodiments and that various changes and modifications may be made without departing from the scope of the invention.

| LIST OF REFERENCE NUMERALS | | | |
|---|---|---|---|
| 10 | male coupling member | 50 | valve member |
| 11 | inlet end | 51 | fluid passage |
| 12 | tapered end face | 52 | sealing ring |
| 13 | shoulder | 60 | tubular member |
| 14 | annular groove | 61 | sealing ring |
| 20 | female coupling | 62 | sealing ring |

-continued

LIST OF REFERENCE NUMERALS

| | | | |
|---|---|---|---|
| | member | 63 | sealing ring |
| 21 | main body | 65 | annular flange |
| 22 | front opening | 66 | shoulder |
| 23 | circular inner surface | 70 | outer sleeve |
| | | 71 | cut away portion |
| 23a | internal projection | 72 | resilient leg |
| 24 | valve seat | 73 | enlargement |
| 25 | valve opening | 80 | sliding sleeve |
| 26 | flanged end | 81 | guide portion |
| 27 | radial openings | 82 | inward shoulder |
| 28 | reduced platform | 83 | chamfer |
| 29 | stopper rib | 85 | locking balls |
| 30 | hose connector | 90 | thrust member |
| 31 | sealing ring | 91 | aperture |
| 35 | annular flange | | |
| 36 | cam surface | | |
| 41 | compression spring | | |
| 42 | compression spring | | |
| 43 | compression spring | | |

What is claimed is:

1. In a fluid coupler having a female coupling member with an incorporated valve and a male coupling member for connection to the female coupling member for opening the valve to start a fluid flow therebetween, the combination comprising:

a generally cylindrical main body constituting said female coupling member and shaped to have an axial bore with front and rear openings at its axial ends, said cylindrical main body being provided intermediate the axial ends with an annular flange projecting inwardly thereof to define a valve seat;

a valve member slidably received within the main body to be movable in the axial direction thereof, said valve member including a head portion having an outside diameter greater than the inside diameter of said internal annular flange and located on the rear side thereof so as to be cooperaive with said valve seat to define said valve, said head portion of the valve member being shaped to define a fluid passage between its outer peripheral portion and the inner surface of the main body at the portion rearwardly of said internal annular flange when it is in an open position;

a connection plug fitted in the rear opening of the main body for connection of the female coupling member with a source of fluid;

a compression spring interposed between the valve member and the connection plug so as to bias the valve member into a closed position where the head portion of the valve member is in sealing contact with the valve seat;

a turbular member slidably received within the main body forwardly of the valve member so as to be movable therewith, said tubular member being provided at its front end with first sealing means adapted to be brought into sealing contact with the male coupling member to be inserted within the front opening of the main body and being provided around its periphery with second sealing means which projects outwardly therefrom so as to be brought into sealing contract with the inner surface of the main body when the valve member is in the open position;

a thrust member operatively interconnecting the valve member and the tubular member such that when the male coupling member is inserted in the female coupling the tubular member will be forced thereby to thrust the valve member so as to move it against the biasing force of the compression spring into an open position, said thrust member arranged substantially not to prevent fluid flow from the valve into the tubular member when the valve is opened; and locking means to lock the male and female coulping members at a connecting position where the male member is slid into the female member by a certain distance enough to open the valve as well as ensure sealing contact between the front end of the tubular member and inlet end of the male coupling member;

said valve member having a sealing ring in sealing contact with the valve seat on the rear wall of said annular flange, said sealing ring being fitted around a reduced-in-diameter section of said valve member extending forwardly from the head portion at the juncture between the reduced-in-diameter section and the head portion of a larger diameter;

said sealing ring being fitted around said reduced-in-diameter section with its outer periphery projecting radially outwardly of the head portion of said valve member, said main body being provided on its cylindrical inner surface with an exially elongated and radially reduced platform which extends rearwardly from said annular flange by a limited distance, said platform having a diameter substantially uniformly along its length which is larger than the inside diameter of the annular flange but smaller than the remaining rear portion of the main body such that the sealing ring is kept in sealing contact with the platform to close the valve while it is moved together with the valve member within the axial length of the platform and is out of sealing contact with the platform to open the valve when it is moved together with the valve member rearwardly beyond the rear end of the platform, and said axial length of the platform being long enough to allow the valve member to compress the spring sufficiently for developing a secure sealing contact between the male coupling member and the tubular member before the valve member is forced by the male coupling member to move further rearwardly with the sealing ring into the open positon.

2. The fluid coupler as set forth in claim 1, wherein said locking means comprises at least one locking ball retained in a radial hole in the front peripheral wall of the main body to be movable between a lock position where said at least one locking ball projects inwardly of the main body and a release position where said at least one locking ball retards in the hole, said at least one locking ball being biased to the lock position, the location of said at least one locking ball along the axial length of the main body being such that such at least one locking ball projects into an annular groove in the end portion of the male coupling member to lock the same when the male coupling member is inserted in the main body enough to move the valve member in the open position and is prevented from projecting into the lock position by being restricted by the outer surface of the tubular member when the valve member and the tubular member are moved into a frontmost position to close said valve, and the axial length of said platform being designed to be longer than the travelling length of the tubular member required to release said at least one locking ball out of the abutting engagement therewith, whereby said sealing ring is kept in sealing contact with the platform even when the tubular member moves rearwardly independently of the male coupling member by such a distance that the ball projects inwardly at the portion immediate front edge of the tubular member to lock the same in position.

3. The fluid coupler as set forth in claim 1, wherein said first sealing means is a sealing ring with its outer periphery as well as its rearward periphery supported by a recessed portion formed in the front inner surface of the tubular member, said male coupling member having a tapered end face which is in sealing contact with said sealing ring.

4. In a fluid coupler having a female coupling member with an incorporated valve and a male coupling member for connection to the female coupling member for opening the valve to start a fluid flow therebetween, the combination comprising:

a generally cylindrical main body constituting said female coupling member and shaped to have an axial bore with front and rear openings at its axial ends, said cylindrical main body being provided intermediate the axial ends with an annular flange projecting inwardly thereof to define a valve seat;

a valve member slidably received within the main body to be movable in the axial direction thereof, said valve member including a head portion having an outside diameter greater than the inside diameter of said internal annular flange and located on the rear side thereof so as to be cooperative with said valve seat to define said valve, said head portion of the valve member being shaped to define a fluid passage between its outer peripheral portion and the inner surface of the main body at the portion rearwardly of said internal annular flange when it is in an open position;

a connection plug fitted in the rear opening of the main body for connection of the female coupling member with a source of fluid;

a compression spring interposed between the valve member and the connection plug so as to bias the valve member into a closed position where the head portion of the valve member is in sealing contact with the valve seat;

a turbular member slidably received within the main body forwardly of the valve member so as to be movable therewith, said tubular member being provided at its front end with first sealing means adapted to be brought into sealing contact with the male coupling member to be inserted within the front opening of the main body and being provided around its periphery with second sealing means which projects outwardly therefrom so as to be brought into sealing contract with the inner surface of the main body when the valve member is in the open position;

a thrust member operatively interconnecting the valve member and the tubular member such that when the male coupling member is inserted in the female coupling the tubular member will be forced thereby to thrust the valve member so as to move it against the biasing force of the compression spring into an open position, said thrust member arranged substantially not to prevent fluid flow from the valve into the tubular member when the valve is opened; and locking means to lock the male and female coulping members at a connecting position where the male member is slid into the female member by a certain distance enough to open the valve as well as ensure sealing contact between the front end of the tubular member and inlet end of the male coupling member;

said thrust member being integral with said valve member to extend forwardly therefrom and is shaped in a generally tubular configuration with a plurality of apertures formed in the peripheral wall for permitting fluid flow therethrough, the front end of said thrust member being inserted into the rear end portion of said tubular member to be connected thereto, said rear end portion being provided on its outer surface with an annular projection which abuts against a stopper rib projecting inwardly from the inner surface of the main body at the portion spaced axially forwardly from said annular flange to prevent said tubular member from being removed through the front opening of the main body, said rear end portion being a thin-walled portion capable of resiliently flexing outwardly and inwardly so that the tubular member can be assembled into the main body by flexing inwardly that portion of said rear end portion to pass the annular projection beyond the stopper rib and that the annular projection is prevented from flexing inwardly by the front end portion of said thrust member after the front end portion of the thrust member is inserted into the thin-walled rear end portion of the tubular member.

5. In a fluid coupler having a female coupling member with an incorporated valve and a male coupling member for connection to the female coupling member for opening the valve to start a fluid flow therebetween, the combination comprising:

a generally cylindrical main body constituting said female coupling member and shaped to have an axial bore with front and rear openings at its axial ends, said cylindrical main body being provided intermediate the axial ends with an annular flange projecting inwardly thereof to define a valve seat;

a valve member slidably received within the main body to be movable in the axial direction thereof, said valve member including a head portion having an outside diameter greater than the inside diameter of said internal annular flange and located on the rear side thereof so as to be cooperative with said valve seat to define said valve, said head portion of the valve member being shaped to define a fluid passage between its outer peripheral portion and the inner surface of the main body at the portion rearwardly of said internal annular flange when it is in an open position;

a connection plug fitted in the rear opening of the main body for connection of the female coupling member with a source of fluid;

a compression spring interposed between the valve member and the connection plug so as to bias the valve member into a closed position where the head portion of the valve member is in sealing contact with the valve seat;

a turbular member slidably received within the main body forwardly of the valve member so as to be movable therewith, said tubular member being provided at its front end with first sealing means adapted to be brought into sealing contact with the male coupling member to be inserted within the front opening of the main body and being provided around its periphery with second sealing means which projects outwardly therefrom so as to be brought into sealing contract with the inner surface of the main body when the valve member is in the open position;

a thrust member operatively interconnecting the valve member and the tubular member such that when the male coupling member is inserted in the female coupling the tubular member will be forced thereby to thrust the valve member so as to move it against the biasing force of the compression spring into an open position, said thrust member arranged substantially not to prevent fluid flow from the valve into the tubular member when the valve is opened; and locking means to lock the male and female coulping members at a connecting position where the male member is slid into the female member by a certain distance enough to open the valve as well as ensure sealing contact between the front end of the tubular member and inlet end of the male coupling member;

said tubular member having therearound a sealing ring, said main body being formed on its inner surface at the portion corresponding to the sealing ring with a cam surface which is tapered rearwardly to have a larger diameter section forwardly thereof and have a reduced diameter section rearwardly thereof, and said sealing ring being arranged such that it is located in the larger diameter portion to be free from being composed thereby, said sealing ring passing through the cam surface into the reduced diameter section to be compressed into sealing contact therewith.

6. In a fluid coupler having a female coupling member with an incorporated valve and a male coupling member for connection to the female coupling member for opening the valve to start a fluid flow therebetween, the combination comprising:

a generally cylindrical main body constituting said female coupling member and shaped to have an axial bore with front and rear openings at its axial ends, said cylindrical main body being provided intermediate the axial ends with an annular flange projecting inwardly thereof to define a valve seat;

a valve member slidably received within the main body to be movable in the axial direction thereof, said valve member including a head portion having an outside diameter greater than the inside diameter of said internal annular flange and located on the rear side thereof so as to be cooperative with said valve seat to define said valve, said head portion of the valve member being shaped to define a fluid passage between its outer peripheral portion and the inner surface of the main body at the portion rearwardly of said internal annular flange when it is in an open position;

a connection plug fitted in the rear opening of the main body for connection of the female coupling member with a source of fluid;

a compression spring interposed between the valve member and the connection plug so as to bias the valve member into a closed position where the head portion of the valve member is in sealing contact with the valve seat;

a turbular member slidably received within the main body forwardly of the valve member so as to be movable therewith, said tubular member being provided at its front end with first sealing means adapted to be brought into sealing contact with the male coupling member to be inserted within the front opening of the main body and being provided around its periphery with second sealing means which projects outwardly therefrom so as to be brought into sealing contract with the inner surface of the main body when the valve member is in the open position;

a thrust member operatively interconnecting the valve member and the tubular member such that when the male coupling member is inserted in the female coupling the tubular member will be forced thereby to thrust the valve member so as to move it against the biasing force of the compression spring into an open position, said thrust member arranged substantially not to prevent fluid flow from the valve into the tubular member when the valve is opened; and locking means to lock the male and female coulping members at a connecting position where the male member is slid into the female member by a certain distance enough to open the valve as well as ensure sealing contact between the front end of the tubular member and inlet end of the male coupling member;

said thrust member being integral with said valve member to extend forwardly therefrom and is shaped in a generally tubular configuration with a plurality of apertures formed in the peripheral wall for permitting fluid flow therethrough, the front end of said tubular member to bias said tubular member axially forwardly, said tubular member being slidably connected to the thrust member for allowing the tubular member to move rearwardly independently of the valve member by a limited distance while allowing the tubular member to move rearwardly together with the valve member after it has moved that distance, whereby the valve member does not open the valve until the tubular member moves rearwardly independently of the valve member against the biasing force of said additional compression spring to such an extent that enough force by the compressed additional compression spring is applied to the sealing connection between said tubular member and said coupling member.

7. The fluid coupler as set forth in claim 6, wherein said locking means comprises at least one locking ball retained in a radial hole in the front peripheral wall of said main body to be movable between a lock position where said at least one locking ball projects inwardly of the main body and a release position where said at least one locking ball retards in the hole, said locking ball being biased to the lock position, the location of the ball along the axial length of said main body being such that the ball projects into an annular groove in the end portion of said male coupling member to lock the same when said male coupling member is inserted in the said main body enough to move the valve member in the open position and that is prevented from projecting into the lock position by being restricted by the outer surface of said tubular member when said valve member and said tubular member are moved into a frontmost position to close said valve, and said limited distance within which said tubular member moves rearwardly independently of the valve member being longer than the travelling length of the tubular member required to release the ball out of the abutting engagement therewith, said valve member is kept in the closed position even when the tubular member moves rearwardly independently of the male coupling member by such a distance that the ball projects inwardly at the portion immediate front edge of the tubular member to lock the same in position.

* * * * *